United States Patent
Elshocht et al.

(10) Patent No.: US 8,161,276 B2
(45) Date of Patent: Apr. 17, 2012

(54) DEMODULATOR DEVICE AND METHOD OF OPERATING THE SAME

(75) Inventors: Olivier Elshocht, Ixelles (BE); John Hornsby, Kortessem (BE); Joel Grad, Lincent (BE); Panagiotis Arkoudopoulos, Kessel-LO (BE); Philip Marivoet, Tienen (BE); Tom Appermont, Hasselt (BE)

(73) Assignee: Sony Service Centre (Europe) N.V., Londerzeel (BE)

( * ) Notice: Subject to any disclaimer, the term of this patent is extended or adjusted under 35 U.S.C. 154(b) by 564 days.

(21) Appl. No.: 12/373,894

(22) PCT Filed: Jul. 9, 2007

(86) PCT No.: PCT/EP2007/006075
§ 371 (c)(1),
(2), (4) Date: Jan. 15, 2009

(87) PCT Pub. No.: WO2008/009367
PCT Pub. Date: Jan. 24, 2008

(65) Prior Publication Data
US 2009/0327676 A1    Dec. 31, 2009

(30) Foreign Application Priority Data

| Jul. 21, 2006 | (GB) | ................................... | 0614547.8 |
| Jul. 21, 2006 | (GB) | ................................... | 0614548.6 |
| Jul. 21, 2006 | (GB) | ................................... | 0614549.4 |

(51) Int. Cl.
*G06F 15/00* (2006.01)

(52) U.S. Cl. .............................................. 713/2; 713/1

(58) Field of Classification Search .................. 713/1, 2
See application file for complete search history.

(56) References Cited

U.S. PATENT DOCUMENTS

| 4,870,570 | A | * | 9/1989 | Satoh et al. | .................... 713/320 |
| 5,349,664 | A | * | 9/1994 | Ikeda et al. | ........................ 713/2 |
| 6,134,616 | A | | 10/2000 | Beatty | |
| 6,260,058 | B1 | | 7/2001 | Hoenninger et al. | |
| 6,501,999 | B1 | * | 12/2002 | Cai | ................................ 700/82 |
| 6,526,491 | B2 | * | 2/2003 | Suzuoki et al. | ............... 711/164 |

(Continued)

FOREIGN PATENT DOCUMENTS

CN    1384631 A    12/2002

(Continued)

OTHER PUBLICATIONS

Li, Hai et al., "Deterministic Clock Gating for Microprocessor Power Reduction", Proceedings of the Ninth International Symposium on High-Performance Computer Architecture (HPCA-9'03), IEEE Computer Society, XP010629506, (2003).

(Continued)

*Primary Examiner* — Nitin Patel
*Assistant Examiner* — Zahid Choudhury
(74) *Attorney, Agent, or Firm* — Oblon, Spivak, McClelland, Maier & Neustadt, L.L.P.

(57) ABSTRACT

A demodulator device and a method of operating the demodulator device where the demodulator device runs a loaded operating system and operates a communication protocol enabling a host application to control the demodulator device. The demodulator device is configured to respond to receipt of an abort command of the communication protocol by carrying out an abort process which stops current operations and reinitializes the loaded operating system.

18 Claims, 11 Drawing Sheets

U.S. PATENT DOCUMENTS

| | | | | |
|---|---|---|---|---|
| 7,162,279 B2* | 1/2007 | Gupta | | 455/574 |
| 7,305,569 B2* | 12/2007 | Reilly | | 713/300 |
| 2002/0095609 A1* | 7/2002 | Tokunaga | | 713/300 |
| 2002/0152425 A1* | 10/2002 | Chaiken et al. | | 714/23 |
| 2003/0115495 A1 | 6/2003 | Rawson, III | | |
| 2005/0152477 A1 | 7/2005 | Crawley | | |
| 2005/0228967 A1 | 10/2005 | Hirairi | | |
| 2006/0064575 A1* | 3/2006 | Jo | | 713/2 |
| 2006/0206729 A1* | 9/2006 | Hentschel et al. | | 713/300 |

FOREIGN PATENT DOCUMENTS

| | | |
|---|---|---|
| EP | 0 840 512 | 5/1998 |
| EP | 1 182 545 A2 | 2/2002 |
| GB | 2 395 310 | 5/2004 |
| WO | 02 057893 | 7/2002 |
| WO | 2005 088443 | 9/2005 |

OTHER PUBLICATIONS

Anonymous: "FreeRTOS.org Version 4 is Now Available for Immediate Download—Including Support for Luminary Micro's Stellaris Family of Arm Cortex M3 Based Microcontrollers", Free RTOS, XP-002457856, (2006).

Barry, Richard "Tasks and Co-routines", Freertos Fundamentals, Free FTOS, pp. 1-2, XP-002457866, (2006).

Simon, Richard "Microsoft Windows 2000 API SuperBible", SAMS, pp. 1-3, XP-002457867, (2000).

"Method for pseudo on-line firmware updates for critical subsystems on pc servers" International Business Machines Corporation, vol. 452, No. 131, XP-007129486, Dec. 1, 2001, 1 page.

English translation of Office Action issued Nov. 25, 2011 in corresponding Chinese Patent Application No. 200780027618.5.

* cited by examiner

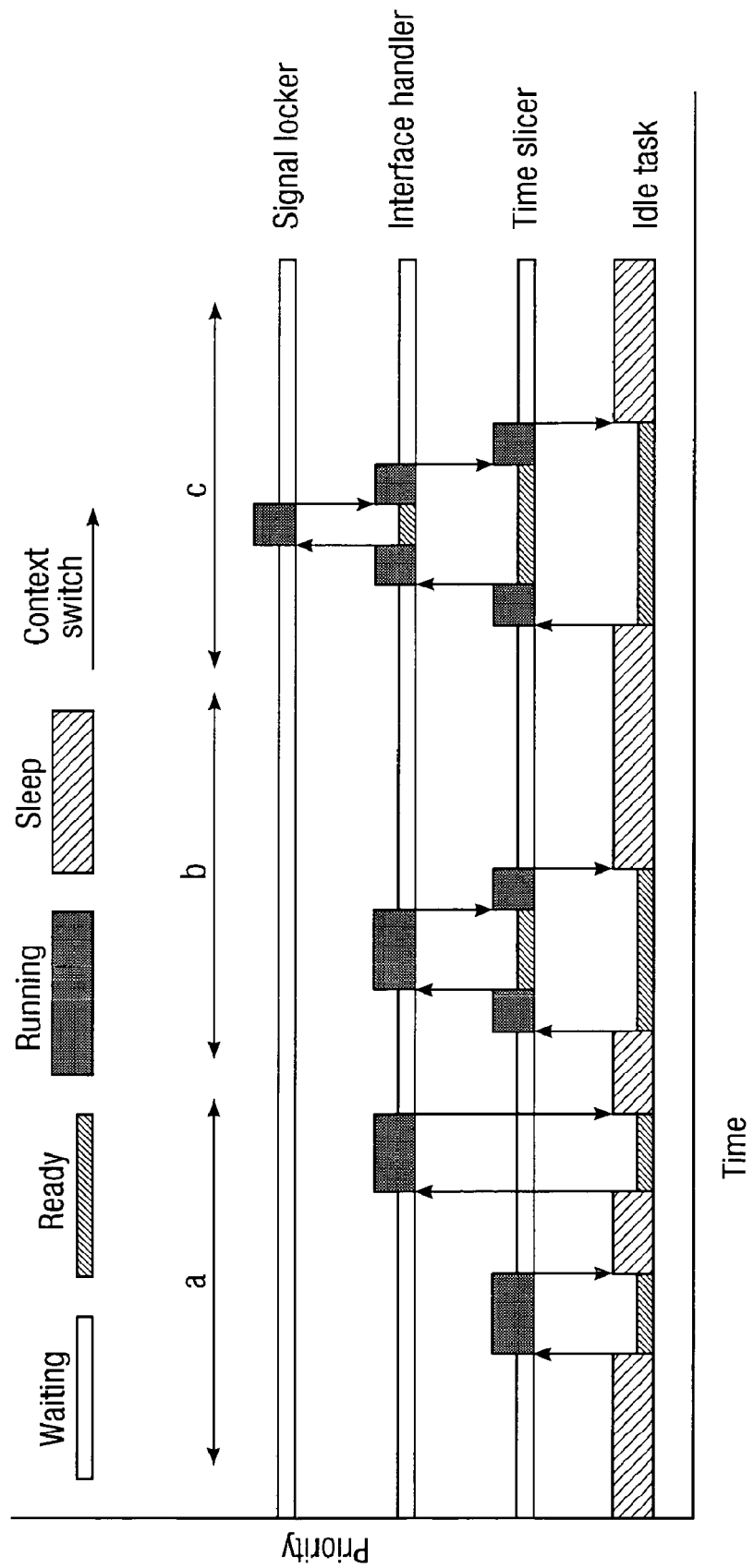

DEMODULATOR DEVICE AND METHOD OF OPERATING THE SAME

The present invention relates to a demodulator device and a method of operating the same.

In digital television receivers, such as those conforming to the digital video broadcast-hand-held (DVB-H) standards, it is known to provide a demodulator device, perhaps in the form of an interchangeable module. When the receiver is first used, a reset signal is sent by a host application in the receiver to the demodulator device and the demodulator device is configured to load various information, such as an operating system and parameters, from the host receiver. The demodulator device then initializes the operating system and any appropriate hardware devices within the demodulator device.

The present application is based on a recognition that, on occasions during use of the receiver, it is desirable to reinitialize the various hardware devices. For instance, after loss of a received signal, the host application of the receiver could decide to move to a different carrier frequency.

It has been considered to stop and reinitialize each hardware device on an individual basis. However, the processing involved to do this is relatively complicated and time consuming.

It is an object of the present invention at least to reduce the problems noted above.

According to the present invention, there is provided a method of operating a demodulator device having a loaded operating system and a communication protocol enabling a host application to control the demodulator device, the method including:

providing the communication protocol with an abort command for stopping current operations of the demodulator device; and in response to receipt of an abort command by the demodulator device, stopping current operation of the demodulator device and reinitializing the loaded operating system of the demodulator device.

The present application also provides a demodulator device configured to run a loaded operating system and operate a communication protocol enabling a host application to control the demodulator device, wherein the demodulator device is configured to respond to receipt of an abort command of the communication protocol by carrying out an abort process which stops current operations and reinitializes the loaded operating system.

Thus, rather than attempting to stop and reinitialize selective parts of the demodulator device, the demodulator device is configured to respond to the abort command to re-boot or reinitialize the loaded operating system, and reinitialize individual parts of the demodulator device, such as its various hardware devices.

Preferably, the demodulator device includes a plurality of hardware devices and is configured to reinitialize the plurality of hardware devices upon receipt of the abort command and as part of the abort process.

The hardware devices can include at least one of a timer, a UART, an SPI, an SDIO, a tuner, a demodulator, a filter and an MPE-FEC.

The timer provides an indication of the system time and allows configuring alarms to go off after a pre-determined amount of time. The UART [Universal Asynchronous Receiver/Transmitter] is a standard serial communication data link, used in the DVB-H receiver to trace logs of activities to e.g. a computer for debugging purposes. The SPI [Serial Peripheral Interface] is a standard synchronous communication data link, used to inter-connect devices such as integrated circuits, used in the DVB-H receiver to communication with and be controlled by a host application processor (i.e. receiver commands and send responses including command results). The SDIO [Secure Digital Input/Output] is a standard for connecting accessory devices to a host application processor, used in the DVB-H receiver as a possible alternative to SPI. The tuner is an analog integrated circuit used to extract and isolate a specific radio frequency channel in the frequency spectrum and convert it down to base band (i.e. bring the carrier frequency to 0 Hz). The demodulator is a digital integrated circuit used to demodulate a DVB-H signal. The filter is a digital integrated circuit used to extract specific packets of data, identified among other things by their packet ID (PID) and table id, as a subset of and from an MPEG-2 transport stream. The MPE-FEC [Multi-Protocol Encapsulation-Forward Error Correction] is standard way of encapsulating any kind of data (e.g. IP packets in the case of DVB-H) within an MPEG-2 transport stream. FEC is a method that includes encapsulating extra codes in the MPEG-2 transport stream, at the transmitter side, and using these codes at the receiver side to detect and correct transmission errors in the MPE data.

Where the demodulator device is to be controlled by an external processor, such as a host application of a receiver, it preferably includes an interface, such as a serial peripheral interface (SPI) to enable this communication. In this case, the demodulator device is preferably configured not to stop operation of the interface upon receipt of the abort command. This enables continued communication with the external processor.

Indeed, preferably, the demodulator device is configured to send an abort response upon completion of the abort process by the demodulator device.

Preferably, the demodulator device is configured to respond to receipt of a reset command of the communication protocol to conduct a reset process which includes downloading an operating system from an external memory and initializing the downloaded operating system.

It will be understood that the reset command could be used to achieve reinitialization of various parts of the demodulator device, such as its hardware devices. However, the full reset process involves downloading the operating system from an external memory, downloading configuration parameters and re-mapping parts of the memory of the demodulator device. This is unnecessary and time consuming.

Provision of the abort command according to the present invention allows reinitialization of the already loaded operating system without having to download that operating system.

The demodulator device of the present invention can be provided as an interchangeable module, for instance as an integrated circuit. It is preferably configured to demodulate digital television signals, for instance conforming to the DVB-H standards, and a digital television receiver may be provided including the demodulator device.

According to the present invention, a computer program or firmware may be provided for operating the communication protocol and abort command as described.

The invention will be more clearly understood from the following description, given by way of example only, with reference to the accompanying drawings, in which.

Figure 3:
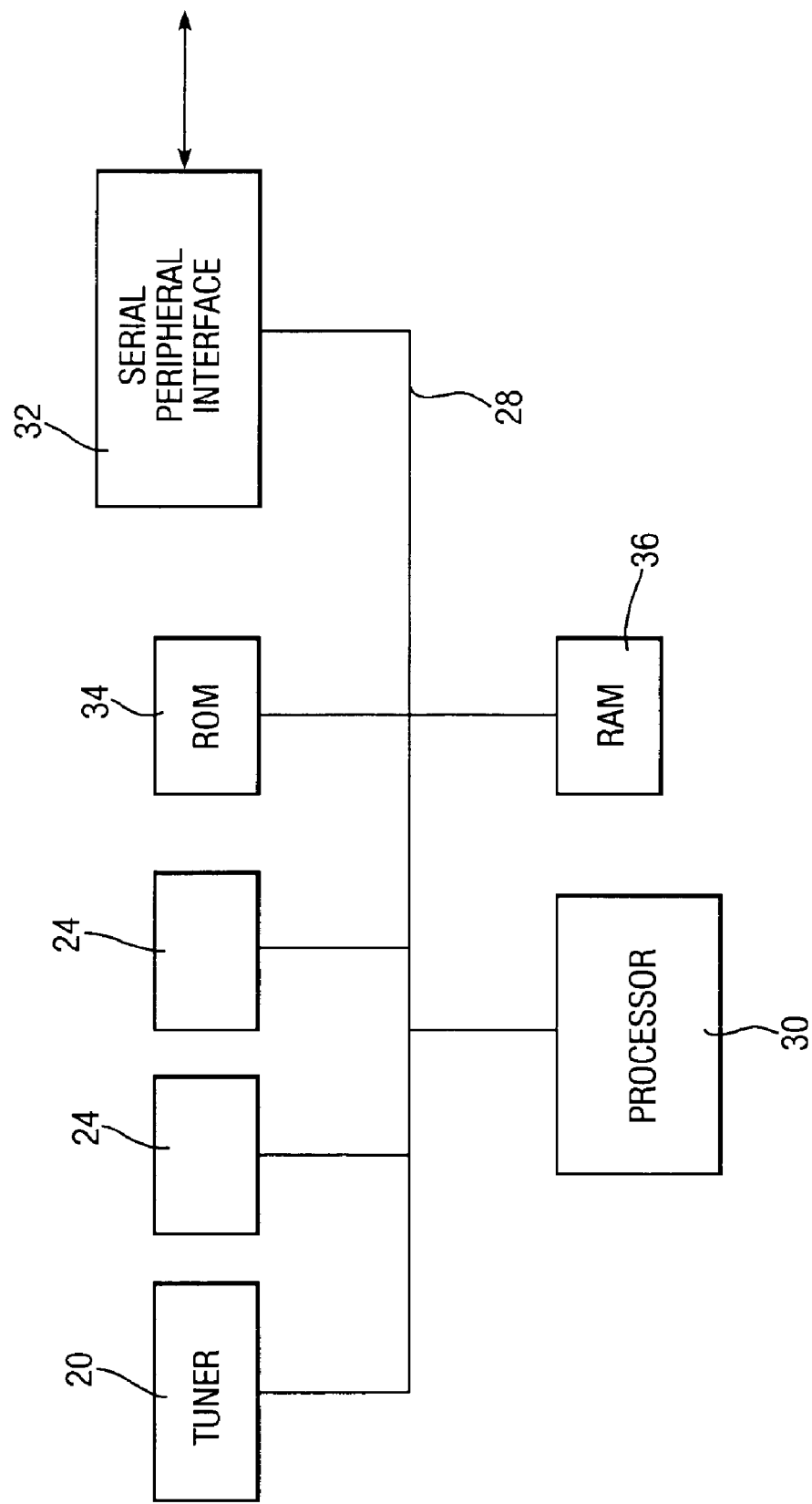
Figure 4:
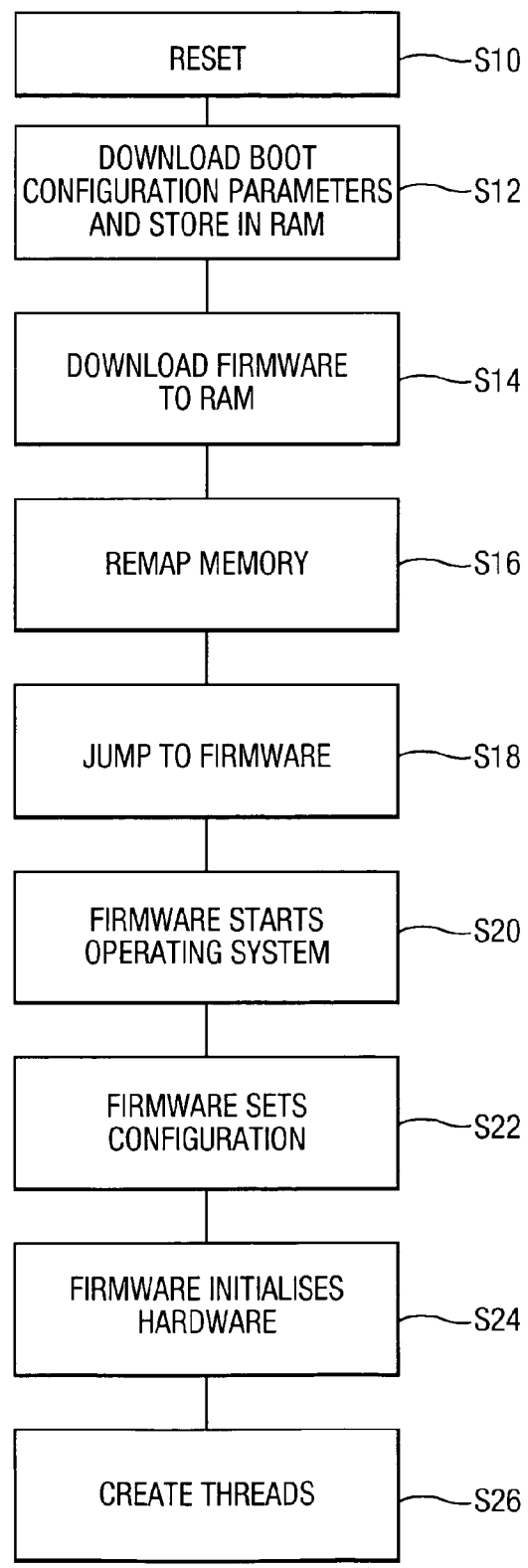
Figure 5:
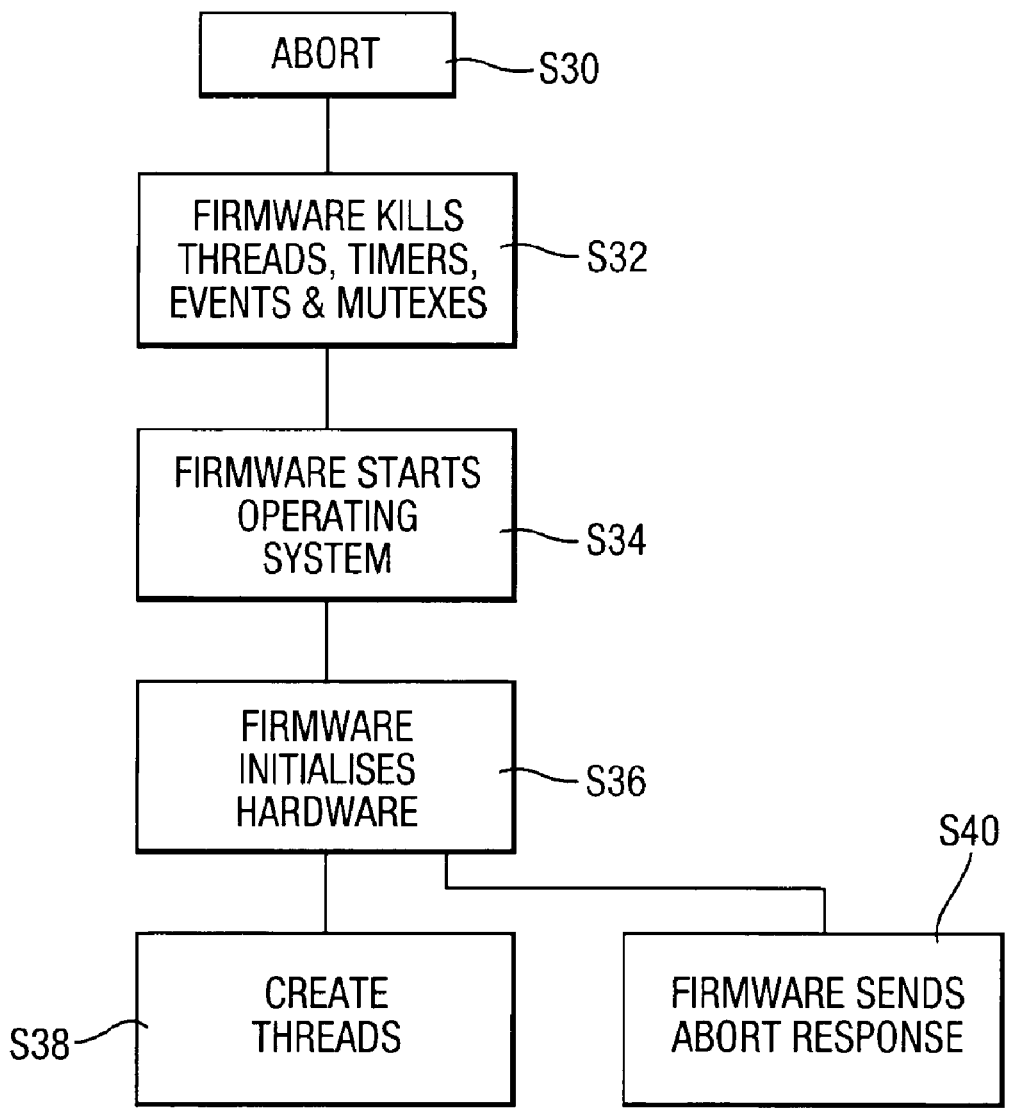
Figure 6:
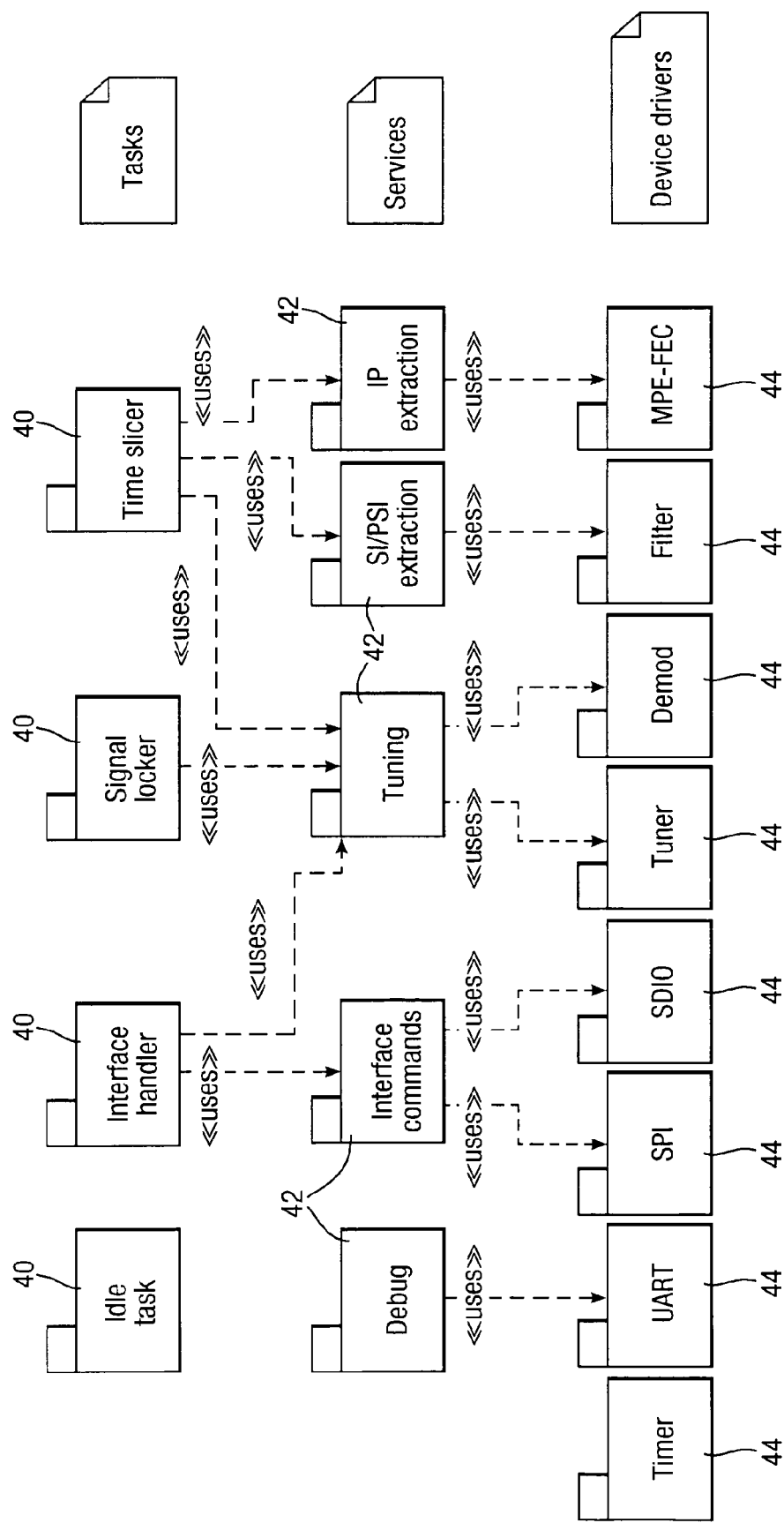
Figure 7:
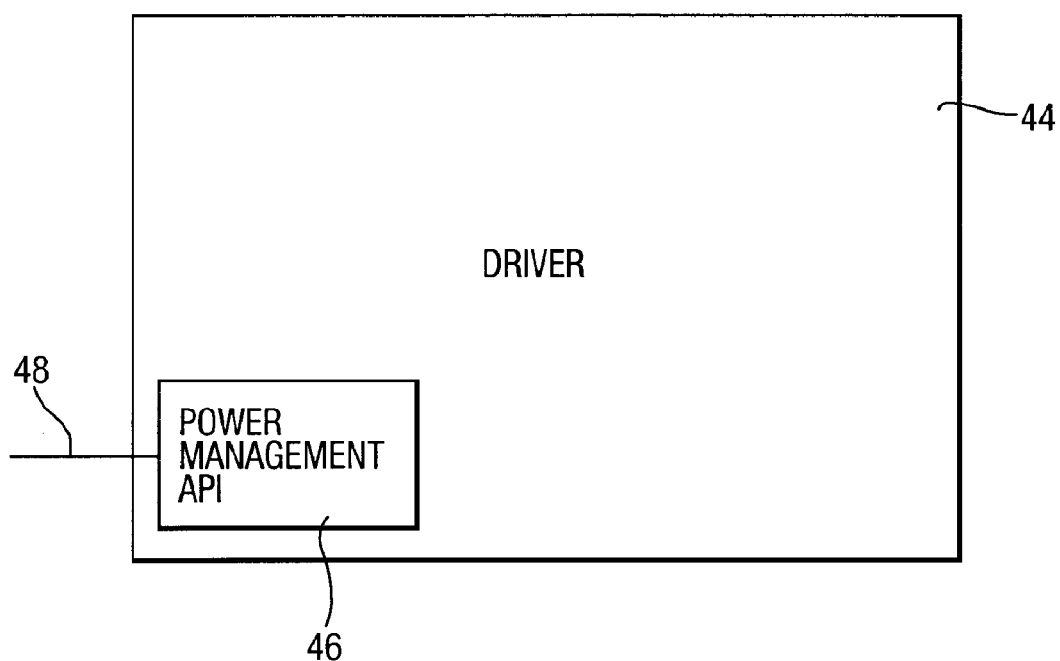
Figure 8:
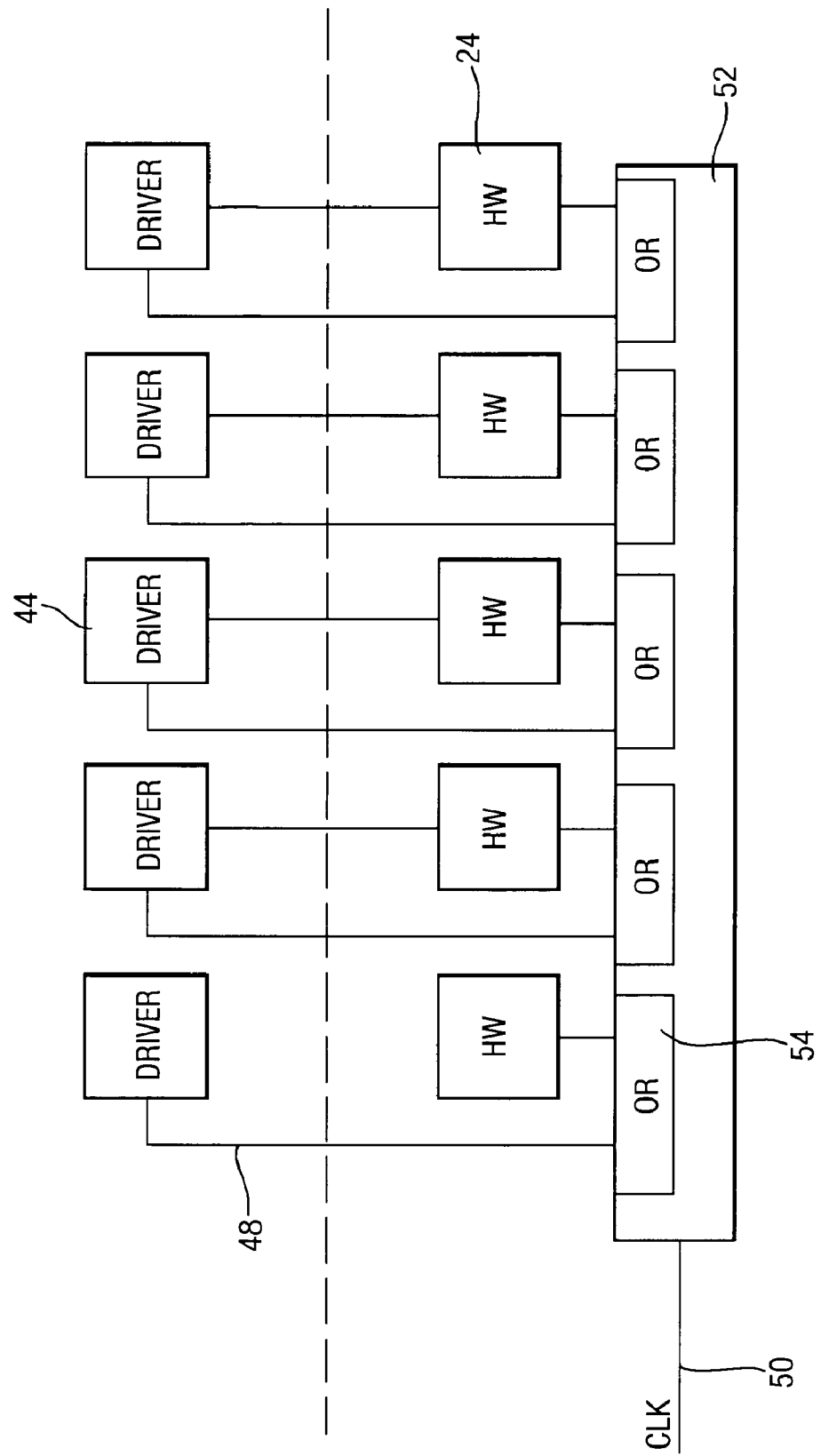
Figure 9:
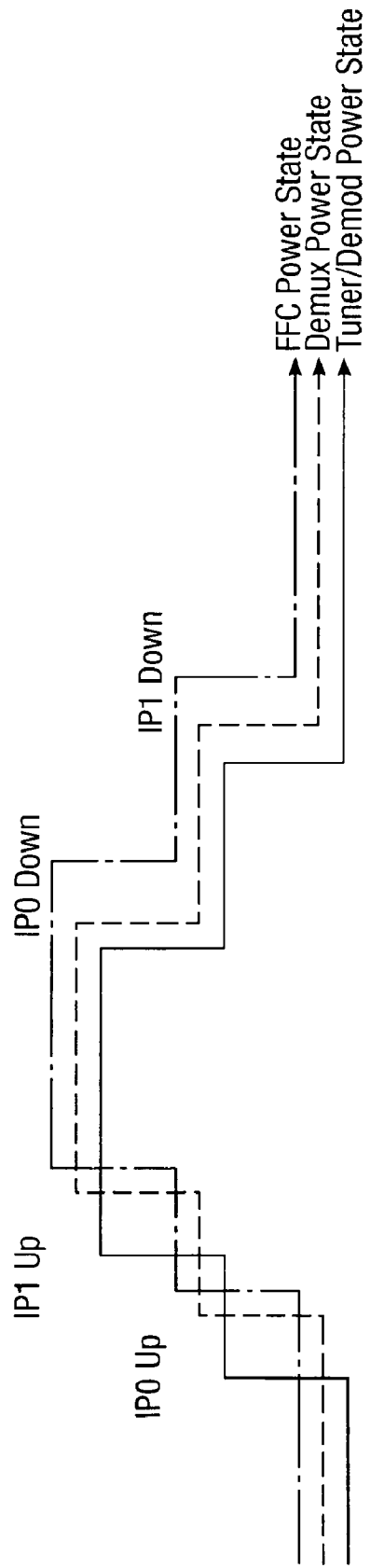
Figure 10:
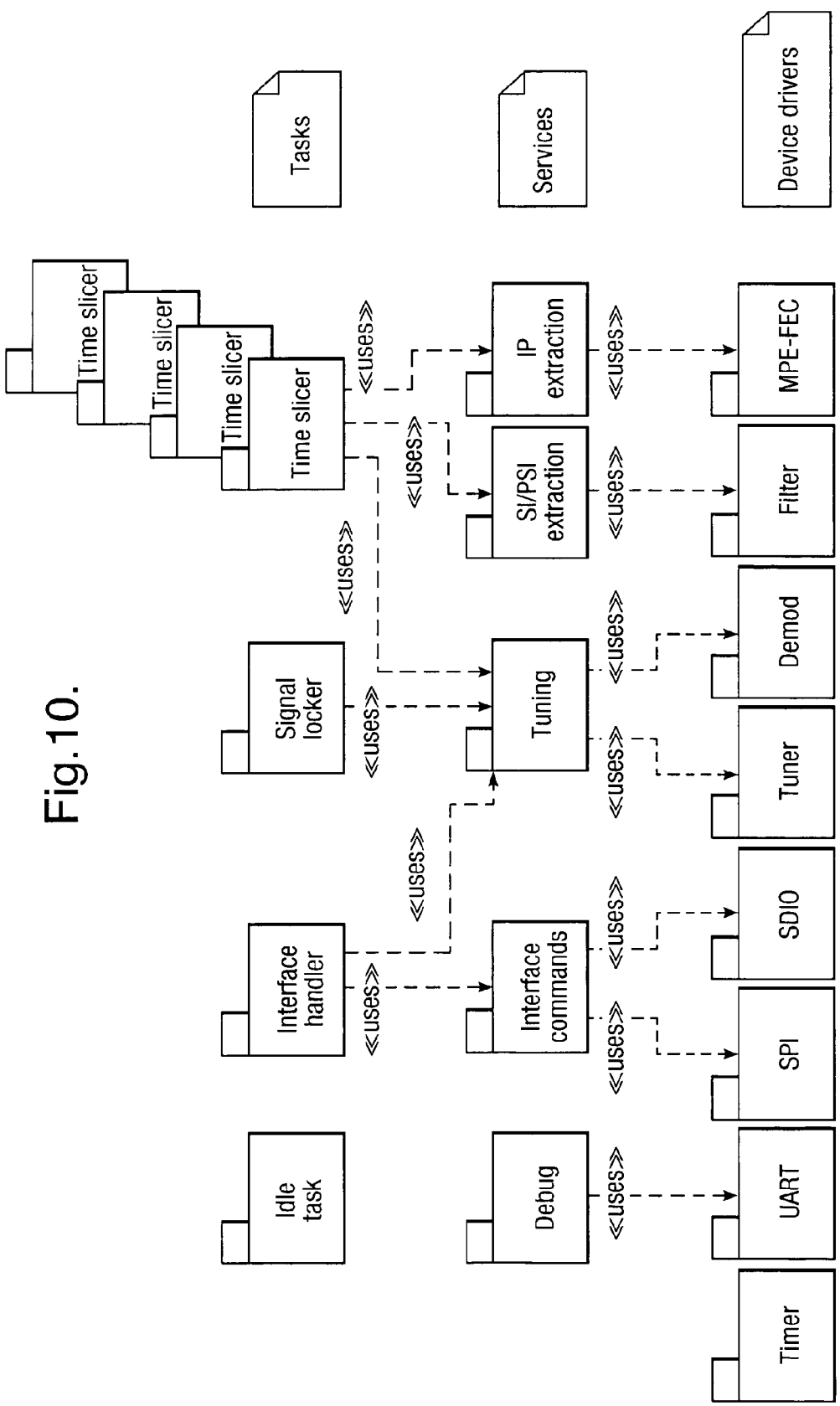

FIG. 3 provides an alternative schematic illustration of an embodiment of the present application;

FIG. 4 illustrates a reset process for the arrangement of FIG. 3;

FIG. 5 illustrates an abort process for the arrangement of FIG. 3;

FIG. 6 illustrates schematically an example of tasks, services and device drivers operated in the arrangement of FIG. 3;

FIG. 7 illustrates schematically a device driver;

FIG. 8 illustrates schematically power control of hardware devices;

FIG. 9 illustrates various power up and down states;

FIG. 10 illustrates the arrangement of FIG. 6 with additional time slicer tasks; and FIG. 11 illustrates relative priority of various tasks.

Figure 1:
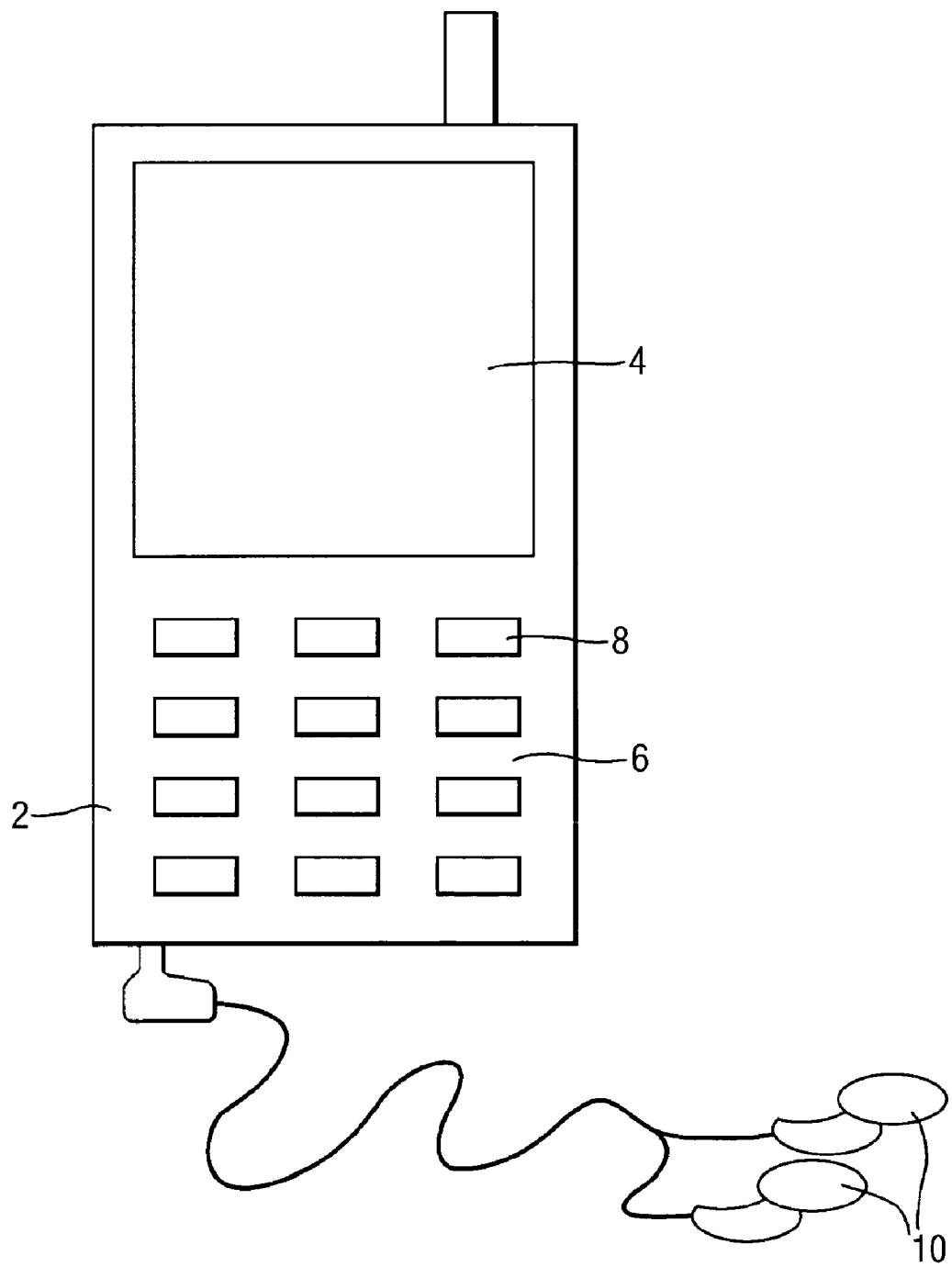
FIG. 1 illustrates an example of a device in which the present invention may be embodied.

The present invention is intended for use in a mobile television receiver (2), for instance a mobile telephone device (2) as illustrated in FIG. 1. Such a mobile television receiver may function according to the DVB-H (Digital Video Broadcast-Handheld) standards used in Europe.

The illustrated receiver (2) includes a display (4) for displaying received television program images and a user interface (6), for instance including a plurality of keys (8), allowing a user to operate or control the receiver (2). Audio reproduction of the audio part of a received television program may be provided to the user for instance by means of a pair of headphones (10).

Figure 2:
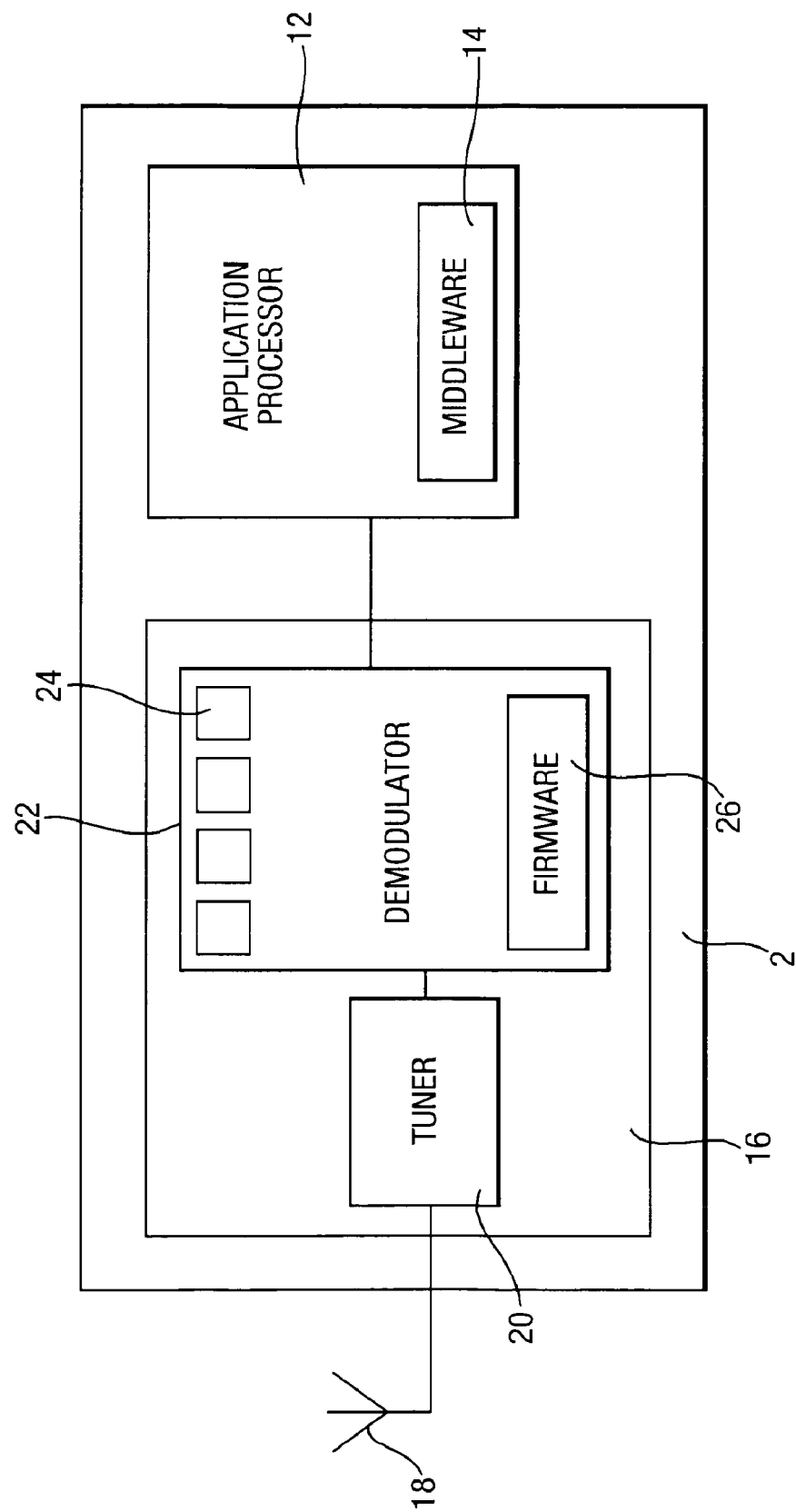
FIG. 2 illustrates schematically a system embodying the present invention.

FIG. 2 illustrates schematically parts of the receiver (2) used in receiving digital television signals.

In the illustrated embodiment, the receiver (2) includes its own application processor or host (12) which can be used to operate television functions of the receiver (2) as well as other functions, such as telephone operations where the receiver (2) is operable also as a telephone. In this respect, the application processor (12) can include a variety of middleware (14) and associated memories for storing such middleware.

Also as illustrated, the receiver (2) includes a module (16) specifically configured to handle the television functions. The module (16) could be made and sold separately and provided for use in a number of different receivers. Although not illustrated the module (16) is configured to output video data for display on the display (4) and audio data for reproduction by the headphones (10). Control of the module (16), for instance changing television channels, can be achieved by means of the application processor (12) under the control of the user interface (6).

An aerial (18) is provided for receiving a number of television signals modulated on a variety of radio frequency carriers.

Within the module (16), a tuner (20) is configured to tune to a particular carrier frequency and provide the received modulated signal to a demodulator (22). The demodulator (22) includes a number of hardware units (24) (in addition to the tuner (20)) such as demodulator and filter blocks. These are operated under the control of firmware (26) previously downloaded from the application processor (12) so as to provide full operation of the module (16) and output of audio/video signals as required.

FIG. 3 provides an alternative schematic illustration of the structure of the module (16).

A bus (28) allows communication between the various components of the module (16). The tuner (20) and other hardware blocks (24) are connected for communication with a processor (30). A serial peripheral interface (32) is provided for communication with the application processor (12) of the receiver (2). Also, a ROM (34) and RAM (36) are provided.

FIG. 4 is a flow diagram illustrating schematically what happens in the arrangement for FIG. 3 during start-up of the module (16). In step S10, a reset signal is provided to the module (16) and to the processor (30). This causes the processor (30) to start executing instructions located at address 0x0000 which physically maps to the ROM (34) which itself contains a boot loader for downloading code from the application processor (12) of the receiver (2). In step S12, using the serial peripheral interface (32), the boot loader receives from the application processor (12) and stores in RAM (36) the boot configuration parameters. For example, these parameters could include the bandwidth of the device (for example 5, 6, 7 or 8 MHz) and the frequency of the receiver source clock.

In step S14, the boot loader then downloads, from the application processor (12), the firmware (26) and stores this in RAM (36). The downloaded image as stored in RAM (36) will include the operating system for the module (16). For reasons to be discussed, significantly, this process takes an appreciable amount of time, for instance approximately 200 ms.

In step S16, the ROM boot loader remaps the memory such that address 0x0000 now physically points to the RAM (36) instead of the ROM (34). In step S18, the processor (30) is made to start executing instructions at address 0x000 again, which now (as a consequence of step S16) physically maps to the RAM (36), which itself contains the firmware (26).

In step S20, the firmware stored in the RAM (36) causes the processor (30) to start the operating system as also stored in RAM (36).

In step S22, the firmware (26) retrieves the configuration parameter values as stored in step S12. These are preferably stored at a predetermined or fixed place in RAM (36). The values are then put in memory according to requirements such that, in step S24, the hardware blocks, including the tuner and filters etc. can be initialized. In particular, the firmware uses the configuration parameters in initializing the hardware.

Finally, in step S26, appropriate threads (to be discussed further below) for carrying out various tasks are created. At this time, module (16) still awaits commands from the application processor (12) with regard to tuning or creating filters for appropriate television programmes etc.

There will be times during use of the receiver (2) when it is required to re-initialize a large number of the hardware components or blocks (20, 24). For instance, it may be decided to change RF channel, i.e. change carrier. Indeed, where a received signal is lost, the application processor (12) could decide to move to a different carrier, rather than merely wait for reception to be resumed.

It is possible to arrange for the processor (30) to release and then restart each hardware block (20, 24) individually. However, the present application recognises for the first time that such a process is complex and time consuming. The present application also contemplates the possibility of reapplying the reset process described with reference to FIG. 4. This is a simple and efficient process. However, it can be time consuming and reference is made to step S14 discussed above and the time taken to download the firmware to RAM (36).

The present application contemplates for the first time the use of an abort command which, rather than operate the entire reset process of FIG. 4 causes the module (16) to stop any and all current operations and release all resources without requiring the processor (30) to stop individually every single operation. In this respect, the firmware (26) controlling the processor (30) does not individually stop operations and release resources, but merely re-initializes the operating system kernel.

FIG. 5 is a flow diagram illustrating schematically what happens upon receiving the abort command.

In step S30, the abort command is sent from the application processor (12) to the module (16).

In response, in step (S32), the firmware kills all threads, timers and events, as well as mutexes by which simultaneous operation by two threads is prevented. In this way, all processes being carried out by the module (16) stop what they are doing and all operating system memory structures are cleared. In practice, a section of memory includes data of the operating system for active threads such that the operating system is aware of those active threads. When the firmware kills all threads, it is not necessary to delete all stored threads, but only to clear the memory block used by the operating system to store the list of active threads. As a result, the operating system does not see any of the threads which were in existence. Significantly, this process is almost instantaneous.

In step S34, the firmware starts the operating system again. In other words, it re-initializes the bootstrap function and carries out a process similar to S20 of FIG. 4.

Compared to FIG. 4, it is not then necessary to conduct the step S22, because it is not necessary to re-store the configuration parameters; these will already be correctly stored in memory. At this point it is worth noting that, if it is required to use different configuration parameters, for instance to use a different bandwidth, then a full reset process would be required.

The process then jumps to step S36 where the firmware initializes the hardware. Compared to step S24 of the reset process, step S36 of the abort process is more simple. In particular, hardware relating to communication, in particular the serial peripheral interface (32) is not re-initialized. In the preferred embodiment, since the serial peripheral interface (32) handles communication with the application processor (12) regarding the abort process, the serial peripheral interface (32) is not re-initialized. On the other hand, if the processing state is kept in memory and restored to the serial peripheral interface (32) after initialization, then it would be possible to carry out a full hardware re-initialization similar to step S24 of the reset process.

In step S38 the appropriate threads are created in the same manner as in step S26 of the reset process. In addition, in step S40, the firmware sends an abort response to the application processor (12) by means of the serial peripheral interface (32) so as to confirm to the application processor (12) that the abort process has completed.

The following are not re-initialized: the module configuration (as done in step S22), the VIC (Vectored Interrupt Controller). Some other blocks are only partially re-initialized: the demodulator, the SPI and SDIO controller (used for host protocol communication), and the DMA (Direct Memory Access) controller.

Thus, there may be provided a demodulator device and a method of operating the demodulator device, which, to avoid shutting down by releasing individual resources, bootstraps the operating system kernel to stop the receiver. The module (16) may be provided as a demodulator chip, such as a DVB-H demodulator chip. Embedded firmware may be provided for the DVB-H demodulator chip.

The general approach applies to any software system, embedded or not, that performs a single basic operation, in particular where the system state after aborting or stopping the current operation is equivalent to the initial state after power-up.

As will be clear from the above, the receiver (16) implements a communication protocol that enables a host application processor (12) to control it. This protocol consists of commands to configure and initiate the main functions of the receiver (16), for instance scan the frequency spectrum to find DVB-H signals, tune on a specific frequency and set up SI and MPE filters and receive payload data. As in any control system, the protocol also contains commands to stop operations such as stop an ongoing frequency spectrum scan and stop and release (clear) SI and MPE filters.

The receiver (2) however implements a communication protocol which is novel by 1) defining an additional #ABORT command that causes the receiver to stop any and all current operations and release all resources without requiring the host application processor to individually stop every single operation and 2) providing the embedded firmware implementation of the #ABORT command itself which does not individually stop operations and release resources, but, instead, re-initializes the operating system kernel.

The #ABORT command provides a quick and simple way for the host application processor (12) to return the receiver (16) to a clean state, e.g. in preparation for tuning to a different frequency or creating a different set of SI and MPE filters. Also, not having to iterate through all operations to stop, and all resources to release, reduces the amount of code and makes the embedded firmware smaller, therefore saving on embedded memory.

In one particular embodiment, the receiver software (previously described as firmware) implementation operates on the embedded real-time kernel operating system ThreadX from Express Logic, Inc. In the initialization process of a ThreadX system one can distinguish a number of steps:

Initialization Process:
0. System Reset (interrupts are disabled)
1. Jump to image entry point.
2. Development tool initialization (including initialization of global variables). (This step can be removed in some embodiments.)
3. main( ): Perform preliminary processing (This includes hardware initialization like setting up timers). (This step as the image entry point can be done in assembly such that there is no main( ) function.)
4. Call tx_kernel_enter( ) to start ThreadX.
5. tx_application_define( ) will be called by ThreadX to:
   a. Create system resources (application threads, mutexes, event flags, timers)
   b. Do device initialization, and
   c. Call initialization methods of software modules.
6. Enter thread scheduling loop (interrupts are enabled)

After this initialization, the system is in a known state X where it can start receiving commands from the host.

On reception of the #ABORT command, the system is forced to the same known state X by re-executing part of the initialization sequence above:

Abort Process:
0. Host sends #ABORT.
1. In a timer thread:
   a. Disable interrupts.
   b. Trash all OS resources (application threads, mutexes, event flags, timers), by re-initializing the OS resource structures to 0.
   c. Set PostABORT flag (global variable that can be queried by module implementations to identify initialization following #ABORT).

Now, the state matches with the state after initialization step 3.

2. Call tx_kernel_enter( ) to re-start ThreadX.
3. tx_application_define( ) will be called by ThreadX to:
   a. Re-create system resources (application threads, mutexes, event flags, timers).
   b. Re-do device initialization, c. Call initialization methods of software modules, and
d. Send response on #ABORT to host.
4. Enter thread scheduling loop (interrupts are enabled)

As part of step 3.c., the implementation of software modules should take into account that global and static variables are initialized only in step 2 of the initialization process. If any global or static variable is expected to be re-initialized on #ABORT, it should be done explicitly in the initialization method of the particular module.

FIG. 6 illustrates schematically an example of the software side of digital television reception such as operated in a module such as module (16) discussed above.

In the top layer, a number of functions which are being implemented by the module (16) are illustrated as threads or tasks (40). These threads or tasks each make use of one or more services (42) available in the layer below them. In order to carry out the functions of those services (42) for the tasks (40), services (42) will, in at least some circumstances, require use of the hardware (20, 24) in the module (16). To do this, each service can make use of one or more device drivers (44) corresponding to respective devices or hardware blocks (20, 24).

The present application considers for the first time issues of power consumption of the various devices or hardware blocks (20, 24). These devices or hardware blocks (20, 24) consume power when turned on and the present application recognises the advantages, particularly for battery powered devices, to turn off the devices or hardware blocks (20, 24) when they are not being used. By way of example, it is quite usual for a digital television receiver to receive and process blocks of data in bursts. Hence, at different times during reception and processing of those burst, various hardware blocks or devices will or will not be in use.

Referring again to FIG. 6, it will be appreciated that, with different tasks and services operating simultaneously, it is possible for devices and device drivers to be required by different tasks and services at the same time. This makes it very difficult to establish at any one time whether or not a particular device or hardware block (20, 24) should be powered up or powered down. In particular, individual tasks will operate independently of one another and, similarly, individual services will operate independently of one another such that normally one task or one service will not know what devices or hardware other tasks or services are using.

As a solution to this problem, the present application proposes the use of a power management application programming interface (API) (46) for each driver (44). This is illustrated schematically in FIG. 7.

In essence, the power management API includes a counter which is incremented each time a service (42) requests use of the corresponding device or hardware block (20, 24) and is decremented each time use of that device or hardware block (20, 24) is released. Given this arrangement, it will be appreciated that whenever the counter has an incremented or non-zero state, there is an indication that at least one service requires use of the respective device or hardware block (20, 24) such that it should remain powered up. Only when the counter is at zero or non-incremented can the respective device or hardware block (20, 24) be powered down.

As illustrated schematically in FIG. 7, the power management API (46) provides a power signal (48) for the respective device or hardware block (20, 24). Responsive to this power signal (48), the respective device or hardware block (20, 24) can be powered up or down.

The power signal (48) could be used in a number of different ways to control the power of respective devices or hardware blocks (20, 24).

FIG. 8 illustrates schematically an arrangement where the power signal (48) is used in conjunction with the main clock signal (50) and a clock block (52).

There are two main sources of power consumption in the devices or hardware blocks (20, 24). Firstly, there is relatively significant power consumption with each transition according to the clock signal. Secondly, there is leakage, irrespective of the clock signal. Although all power to a particular device or hardware block (20, 24) could be turned off, according to the preferred embodiment, for instance as illustrated in FIG. 8, it is sufficient merely to stop the clock for a respective device or hardware block (20, 24) so as to prevent the power losses due to transitions.

In the embodiment illustrated in FIG. 8, the clock signal (50) is provided to the hardware blocks (20, 24) by means of a clock block (52). This may be embodied as a hardware block including a plurality of gates (54) corresponding respectively to hardware blocks (20, 24). Each gate is enabled or not according to the respective power signal (48). In this way the power management API (46) of a driver (44) controls whether or not the clock signal (50) is supplied to the respective hardware block (20, 24).

Either "or" or "and" gates can be used. With an "and" gate, setting the power signal (48) to "one" powers up the hardware; setting it to "zero" powers it down. With an "or" gate, setting the power signal (48) to "one" maintains the block clock at "one" thus freezing the clock and therefore powering down the block; setting the power signal (48) to "zero" makes the block clock equivalent to the system clock, thus powering up the block. Preferably, the hardware uses "or" gates and thus the power signal must be inverted (one means off, zero means on).

It will be appreciated that this arrangement can be used in any circuit where there are a plurality of the individual hardware blocks which can be selectively powered up or down. It is particularly useful in a digital television receiver, such as a DVB-H receiver or module, such as module (16) for use in such a receiver. However, it will have other applications, for instance in a mobile telephone or personal computer.

Thus, there may be provided a system and a method of operating a system, in particular using reference counting to save power by disabling the clocks of individual hardware blocks that are not needed. The approach applies to any system in which the power state of hardware blocks can be controlled independently, and the hardware blocks are used by multiple software tasks or threads asynchronously.

For power management, rather than have a single main power state (on or off), the receiver hardware (20, 24.52) will allow the power of each block (20, 24) to be controlled independently, to save even more power. For example, once a burst has been received and stored in the MPE-FEC memory (24), the tuner (20), demodulator (24) and filter blocks (24) can be turned off while the burst is being error-corrected and transferred to the host or application processor (12). Only after this will the MPE-FEC block be turned off. As discussed above, difficulties in the embedded firmware implementation come from the fact that the power state of a single hardware block (20, 24) may depend on the activities of multiple tasks (40). For example, the tuner may be used by the interface handler (or interface handler task (40)) to perform a SCAN command or by the time slicer (or time slicer task (40)) to receive a burst. Or the MPE-FEC may have to process parallel IP services.

To simplify the implementation, each device driver (44) can independently manage the power state of the hardware block it controls. In this respect, an example of a synchronous power management API is as follows:

| | |
|---|---|
| Request the device to hold its power state on POWERED_ON. | Err_t DrvXXX_PowerUp( ) |
| Release the hold on the power state. | Err_t DrvXXX_PowerDown( ) |

A client or service (42) will call the PowerUp( ) function to indicate that it requires the power state of the device to be held on POWERED_ON. The driver (44) will immediately turn on the device (20, 24) if it is not already on. The client or service (42) then calls PowerDown( ) when the hold can be released. However, the device power state will actually switch to POWERED_OFF only if no other client or service (42) is holding the power on. This is implemented by the driver (44) maintaining a power state counter. The state is initialized to 0, incremented every time PowerUp( ) is called and decremented every time PowerDown( ) is called. The device (20, 24) is turned off when the counter value is 0.

Some services (42) (Tuning, SI extraction and IP extraction) will implement the same APIs. Each device driver implements the power management API, by the use of which services or tasks can control the power state of the corresponding hardware block. Only system tasks need have a notion of for example when the tuner and demodulator hardware blocks need to be powered on. For instance, the tuning service knows that the tuner and demodulator blocks must be powered on to perform a tune operation. However, it does not know when these blocks can be powered down, which would be at the end of the reception of the current burst (i.e. timeslice), which only the IP reception tasks knows about.

In the preferred firmware architecture, tasks do not access device drivers and their APIs directly, but only through the intermediate services blocks in the service layer. Preferably there should be a way by which the services can forward power management requests from the tasks to the device drivers. This is achieved by having services implement the same power management API as device drivers.

In services, the power management APIs are implemented in a way similar to how it is in the device drivers, i.e. with reference counting. The only difference is that instead of controlling a power signal, services call the PowerUp( ) and PowerDown( ) functions of the underlying device drivers, when the reference count is non-zero or zero respectively.

By way of example, with the APIs described above, the time slicer task illustrated in FIG. 6 can easily be implemented as shown in the following pseudo-code:

```
Loop forever:
    SrvTune_PowerUp( )
    SrvTune_AcquireSignalLock( )      /* asynchronous */
    SrvSi_PowerUp( )
    SrvIp_PowerUp( )
    SrvIp_ReceiveBurst( )             /* asynchronous */
    SrvTune_PowerDown( )
    SrvSi_PowerDown( )
    SrvIp_ProcessBurst( )             /* asynchronous */
    SrvIp_PowerDown( )
    RTOS sleep until SrvIp_GetNextTimeSlice( )   /* blocking /*
```

The present application proposes a new system where the power state of individual hardware blocks (20, 24) that are used in combination by multiple software tasks can be controlled independently by disabling their individual clock signal. Reference counting in the lowest software layer (device drivers) (44) may be used to determine when a hardware block can be powered on or off when 1) there are multiple software tasks sharing the same hardware resources; and 2) the multiple software tasks use the hardware resources (and need them to be powered up) asynchronously.

A standard power control reference counting API that can be implemented not only in the driver layer, but also in all the software layers above it, to shield the top layers from having to know which hardware blocks are indirectly used through function call to intermediate layers.

In this way, it is possible to save power in a multi-task multi-threaded system. Also, the system architecture and implementation can be simplified as some global state is not required to be queried or modified by all software components using a specific power controlled hardware block.

The following example, based on the embodiment of FIGS. 2 and 6 supposes that IP extraction mainly requires the use of three main hardware components, namely, the Tuner/Demodulator block, Transport Filter block and FEC Frame Controller block. The software architecture is composed of tasks on top of services which are on top of drivers.

As discussed above, every hardware block (20, 24) is controller by a driver (44). Hardware blocks (20, 24) implementing power management functionalities have their PowerUp( ) and PowerDown( ) couple of functions. Each PowerUp( ) function counts the number of times it is called, the first time it is called the hardware block is powered-on and the counter usage is incremented. All subsequent calls to this PowerUp( ) will only increment the usage counter. The PowerDown( ) works the same way except that it decrements its usage counter until it reaches 0, at this point the hardware (20, 24) will be really powered-off.

For example, the hardware blocks and their power control functions are as follows.

The Tuner block is required to be powered-on prior to any other blocks. The Demodulator block is also required to be active before data can be extracted. In this example, to simplify the explanations, it can be assumed that Tuner and Demodulator blocks are coupled together. However, the Tuner and Demodulator blocks can have their own Power Up( ) and PowerDown( ) functions to save power.

The Transport Filter clock can be activated or deactivate to save power using the DrvDemux_PowerUp( ) and DrvDemux_PowerDown( ) functions.

The FEC Frame Controller clock can be activated or deactivate to save power using the DrvFec_PowerUp( ) and DrvFec_PowerDown( ) functions. The FEC block requires the Transport Filter block to be active to actually receive data, therefore the DrvFec_PowerUp( ) resp. DrvFec_PowerDown( ) functions also internally invoke the DrvDemux_PowerUp( ) resp. DrvDemux_PowerDown( ) functions.

As mentioned above, software functionalities (non hardware specific ones) are implemented in services (42) that make use of drivers (44). The services (42) can also have the PowerUp( ) and PowerDown( ) functions which are called by the tasks using those services. Generally they are also implemented using a usage counter and a call to a driver power control function.

For multiple IP extraction working together with SI extraction, fine power control can easily be achieved with such architecture. Each IP filter extraction running from a task powers up specific resources whenever it needs them and powers them off when they are not needed anymore, the key architecture point here is the fact that each IP or SI filter is treated independently and uses the power control functions of each shared resource.

The following is an example of Tuner/Demodulator, Demux and FEC Frame Controller power usage in case of two IP filters working at the same time and sharing the hardware resources for some time. FIG. 9 represents the power counter usage value of the three main drivers and the following shows Pseudo-code for 2 independent services running concurrently with values between parenthesis represents the power usage counter of every driver.

| IP0 | | IP1 | |
|---|---|---|---|
| SrvIp_GetNextTimeSlice | | SrvIp_GetNextTimeSlice | |
| -> Sleep DeltaT_0 msec | | -> Sleep DeltaT_1 msec | |
| SrvTuning_PowerUp | | SrvTuning_PowerUp | |
| -> DrvTuner_PowerUp | (0 -> 1) | -> DrvTuner_PowerUp | (1 -> 2) |
| SrvTuning_Tune | | SrvTuning_Tune | |
| SrvIp_PowerUp | | SrvIp_PowerUp | |
| -> DrvFec_PowerUp | (0 -> 1) | -> DrvFec_PowerUp | (1 -> 2) |
| -> DrvDemux_PowerUp | (0 -> 1) | -> DrvDemux_PowerUp | (2 -> 3) |
| SrvSi_PowerUp | | SrvSi_PowerUp | |
| -> DrvDemux_PowerUp | (1 -> 2) | -> DrvDemux_PowerUp | (3 -> 4) |
| SrvIp_ReceiveBurst | | SrvIp_ReceiveBurst | |
| SrvTuning_PowerDown | | SrvTuning_PowerDown | |
| -> DrvTuner_PowerDown | (2 -> 1) | -> DrvTuner_PowerDown | (1 -> 0) |
| SrvSi_PowerDown | | SrvSi_PowerDown | |
| -> DrvDemux_PowerDown | (4 -> 3) | -> DrvDemux_PowerDown | (2 -> 1) |
| SrvIp_PowerDown | | SrvIp_PowerDown | |
| -> DrvDemux_PowerDown | (3 -> 2) | -> DrvDemux_PowerDown | (1 -> 0) |
| -> DrvFec_PowerDown | (2 -> 1) | -> DrvFec_PowerDown | (1 -> 0) |
| SrvIp_ProcessBurst | | SrvIp_ProcessBurst | |

As will be discussed for a particular embodiment below, in devices such as module (16) of FIG. 2, the number of tasks are required to be carried out simultaneously or at least in an overlapping manner. For instance, following on from FIG. 6, as illustrated in FIG. 10, there may be multiple time slicer tasks each operating a respective IP (internet protocol) reception process. Each time slicer task could have in use its own respective set of services (for instance tuning, S/PSI:extraction and IP:extraction services) or more preferably, and as illustrated, share the same set of services. However, irrespective, it is necessary to provide some system allowing all of the tasks to operate at the same time within the module (16).

Where a real time operating system is available, it is known to map individual tasks as respective threads. An area of memory is provided for a stack for each respective thread and each thread is processed independently of all other threads, with the stack allowing the operating system to provide time-sharing of the resources in the module (16). In particular, the stack allows a thread to be broken away from at any convenient time in preference to another thread and returned to as and when possible.

In this manner, individual respective threads could be provided for the tasks illustrated in FIG. 10, namely the idle task, the interface handler, the signal locker and the four time slicers.

Unfortunately, the use of threads in this manner does require also the use of respective stacks which require memory. In most devices using a real time operating system, there tends to be sufficient memory to make the requirements for the stacks insignificant. However, for devices such as those contemplated for handheld digital television reception, for instance the module (16) of FIG. 2, it is expected that there will be limited resources in the way of memory.

As an alternative, it would be possible to combine all of the individual parts of the tasks as a single state machine. This would not have the same memory requirements, but has very low flexibility. By way of example, considering task A which requires steps A1 and A2 and also task B which requires steps B1, B2 and B3, a single state machine could be constructed which, by way of example, always carries out the steps in the following order: A1, B1, A2, B2, B3. It will be appreciated that this fixed arrangement has very limited flexibility and can be quite unsuitable where unexpected circumstances arise. In particular, one such unexpected circumstance can be an event that must be handled within a time frame specified by real-time constraints. With a fixed state machine, the time latency before the event is handled can be up to one full loop through the state machine.

The concept of co-routines is also known. After predetermined steps in the co-routine, the co-routine yields, thereby allowing the system to choose a step perhaps from another co-routine, before returning to the point at which the first co-routine yielded. Thus, for the example given above, a first co-routine could be constructed with yield points after step A1 and after step A2 and, similarly, a co-routine could be constructed with yield points after step B1, after step B2 and after step B3. The overall process would proceed in a known manner by, for instance, starting with step A1 and, at the yield point at the end of step A1, checking to see whether the system is ready to carry out step B1. If the system is ready, the process moves to step B1, otherwise, the process moves on to A2. This arrangement provides some degree of flexibility without the memory demands of stacks for each process.

The present application proposes for the first time an arrangement in which co-routines are embedded within an individual thread. In particular, processes (otherwise described here as tasks) which have the same or similar priority can be arranged as co-routines within a single thread, allowing processes with quite different priorities to have their own individual threads. For the embodiment illustrated in FIG. 10, this would mean that the time slicer tasks which operate filtering of bursts of data can all be operated as co-routines within a single thread. Hence, only a single memory stack is needed for the multiple time slicer tasks. On the other hand, as will be explained below, where perhaps the interface handler or signal locker needs to interrupt the time slicer tasks, this can be done, because they operate with separate threads having respective memory stacks.

A similar approach could be used where multiple tuners are available. In this case, multiple interface handler or signal locker tasks might co-exist by way of co-routines within respective threads.

Thus, there may be provided a system and method of prioritisation, in particular prioritisation of time important routines for instance in a digital television receiver using a real-time operating system. The proposals apply to software system that has hard-real time constraints on a subset of the tasks it performs.

In the context of the module (16) described above and the processes of FIGS. 6 and 10, the tasks to be performed by the software of the preferred embodiment are 1) configuring and controlling the tuner and the demodulator, scheduling time slices and extracting SI/PSI tables and IP services, and communicating with the host application processor (12). The goal of the architecture is to make it possible to perform all the software tasks while optimizing timing, power consumption and memory usage.

It is assumed that the processor (30) of FIG. 3 is sufficiently powerful to execute all of the software tasks. However, there are specific events that require special attention because of the real time constraints that they impose. One such event is the signal lock lost interrupt. Servicing this interrupt and starting the auto-recovery procedure should occur as quickly as possible, suspending other activities if necessary, as any delays will potentially cause IP packets to be lost. This means that the signal acquisition task, when it needs to run, must pre-empt any task that is processing SI/PSI tables or MPE-FEC frames (e.g. performing error correction to extract IP data). On the other hand, tasks such as extracting SI/PSI tables, performing software AGC, or sending debug messages to the UART, are less time-critical than processing MPE-FEC frames and extracting IP services. They could have to be made pre-emptible by the IP service task As discussed above, it is considered that memory is a critically sparse resource in many devices, such as a DVB-H receiver. In some embodiments, no more than 64 kiB of RAM might be available. Therefore, the architecture should aim at minimizing: code size; data size; and stack space.

As explained above, the typical way of achieving real-time constraints is to use a Real-Time Operating System (RTOS) and assigning a separate RTOS pre-emptible thread and priority to each software task (40). However, each RTOS thread requires a separate execution stack, which increases the total memory requirement of the system.

By virtue of the proposals of the present application, it is possible to provide a DVB-H receiver (2) which assigns the software tasks to a combination of 1) RTOS pre-emptible threads, to achieve real-time constraints for tasks (40) that have them and 2) classical co-operative co-routines for tasks (40) that do not have relative real-time priorities. Groups of co-routines are run within a single RTOS pre-emptible thread, and therefore share the same execution stack. Multi-tasking is achieved by co-operative scheduling, which means each task (i.e. co-routine) co-operative yields control from time to time to allow other tasks (i.e. co-routine) to execute. In this way, the use of RTOS pre-emptible threads allows real-time constraints to be achieved where it is important, while co-operative co-routines saves memory.

Referring to FIGS. 6 and 10, it is noted that the top layer blocks (40) are called tasks, but can be considered to be threads. In reality, the time slicer thread runs several co-routines, each co-routine executing one respective IP reception task. In order to limit stack space, the number of RTOS threads in the system should be kept to a strict minimum. However, as explained previously, some tasks should run asynchronously and within low timing constraints.

An example of real time task scheduling is shown in FIG. 11. Although the tasks involved have been mentioned above, a brief summary of each is given below.

The time slicer task is a low-priority task which controls the system heartbeat. For every (for example DVB-H) time slice, it 1) requests the Tuning service to wake up the hardware and reacquire the signal lock, 2) waits for SI/PSI or IP events and processes them, 3) requests the Tuning service to shut off the hardware, and 4) sleeps until the next time slice. Using the proposals of the present application, this thread actually runs several co-routines. Each co-routine performs the task of receiving a single IP service as listed above, allowing other IP services to be processed by using co-operative scheduling.

The interface handler is a medium-priority task which handles the host processor commands, which by nature are asynchronous to the stream handling. It manages the receiver state and uses the Tuning service to implement the SCAN and TUNE commands. Because the SPI host interface is a performance bottleneck, this task must have a higher priority than the time slicer task.

The signal locker is a high-priority task which responds to the signal lock lost event or any other events that require quick handling. In case of signal lock lost, it initiates the recovery procedure.

The idle task is the lowest priority task in the system. It is scheduled only when all the other tasks are sleeping and or pending on an event. Its only function is to set the processor (30) in a low-power state.

FIG. 11 illustrates typical scheduling scenarios and demonstrates how an RTOS helps construct a simple design that meets the low-latency timing and power constraints.

Section (a) shows the idle task being scheduled between time slices. The only thing this task does is to put the processor (30) into a low-power state. The processor (30) will wake up at the next time slice (timer set up by the time slicer task) or whenever a host command is received (SPI/SDIO interrupt) and to be processed by the interface handler.

Section (b) illustrates how the real-time scheduling properties enable serving host commands quickly, even if the time slicer is running. For example, if the host sends a SEND_STAT_DATA command while the time slicer is processing SI tables, basically the only delay before the request is served will be a context switch.

Section (c) illustrates multiple levels of pre-emption. It shows how an RTOS helps handling signal lock lost interrupts with virtually no delays.

Managing a single IP service as described in the previous section is easy enough. However, as illustrated in FIG. 10, the receiver will support the reception of up to four IP services simultaneously, each IP service having its own value for delta-t and its own power-up periods that may overlap with that of other IP services.

The easy way to implement this would be to create one thread per IP service, but, as discussed above, it is desirable to limit memory usage. Because different priorities are not a requirements for IP services, co-operative multi-tasking is used. This is could be implemented with state machines, but preferred embodiments use the more elegant, easier to read and easier to maintain co-routines. As explained above, co-routines allow multiple exit points in a function, while maintaining the execution state, which makes the control flow more explicit than in a switch-based state machine. Indeed a co-routine allow a co-operative task to be implemented in a way that is independent from other tasks.

The invention claimed is:
1. A demodulator device including a plurality of hardware devices, the demodulator device being configured to
run a loaded operating system,
operate a communication protocol enabling a host application to control the demodulator device, and respond to receipt of an abort command of the communication protocol by carrying out an abort process, wherein the abort process stops current operations, re-initializes the loaded operating system without downloading the operating system from an external memory, and reinitializes the plurality of hardware devices, and the demodulator device is configured to re-initialize the loaded operating system by clearing a memory block used by the operating system to store a list of active threads.

2. The demodulator device according to claim 1, wherein the plurality of hardware devices include at least one of:
a timer, a UART, an SPI, an SDIO, a tuner, a demodulator, a filter and an MPE-FEC.

3. The demodulator device according to claim 1, wherein
the demodulator device includes a serial peripheral interface, and
the demodulator device is configured not to stop operation of the serial peripheral interface upon receipt of the abort command.

4. The demodulator device according to claim 1, wherein the demodulator device is configured to send an abort response upon completion of the abort process by the demodulator device.

5. The demodulator device according to claim 1, wherein
the demodulator device is configured to respond to receipt of a reset command of the communication protocol, and
to conduct a reset process that includes downloading the operating system from the external memory and initializing the downloaded operating system in response to the reset command.

6. The demodulator device according to claim 1, wherein the demodulator device is configured as an interchangeable module.

7. The demodulator device according to claim 6, wherein the demodulator device is configured as an integrated circuit.

8. The demodulator device according to claim 1, wherein the demodulator device is configured to demodulate digital television signals.

9. A digital television receiver, comprising:
the demodulator device according to claim 1; and
a host application configured to operate the communication protocol and to send the abort command to the demodulator device.

10. A method of operating a demodulator device including a plurality of hardware devices and having a loaded operating system and a communication protocol enabling a host application to control the demodulator device, the method comprising:
providing the communication protocol with an abort command that stops current operations of the demodulator device; and
stopping, by the demodulator device and in response to receipt of the abort command, current operations of the demodulator device, re-initializing the loaded operating system of the demodulator device without downloading the operating system from an external memory, and re-initializing the plurality of hardware devices wherein
re-initializing the loaded operating system includes clearing a memory block used by the operating system to store a list of active threads.

11. The method according to claim 10, further comprising:
re-initializing, in response to receipt of the abort command, at least one of:
a timer, a UART, an SPI and SDIO, a tuner, a demodulator, a filter and an MPE-FEC of the demodulator device.

12. The method according to claim 10, further comprising not stopping operation of a serial peripheral interface of the demodulator device upon receipt of the abort command.

13. The method according to claim 10, further comprising sending an abort response upon completion of an abort process.

14. The method according to claim 10, further comprising:
providing the communication protocol with a reset command that resets the demodulator device; and
downloading, in response to receipt of the reset command by the demodulator device, the operating system from the external memory and initializing the downloaded operating system.

15. A computer program embodied on a non-transitory computer readable medium comprising program code that when run on a computing device, causes the computing device to perform the method of claim 10.

16. The computer program of claim 15, wherein the computer program is configured as firmware.

17. The computer program of claim 15, wherein the computing device is the demodulator device.

18. A computer program product comprising program code stored on a non-transitory computer readable medium that when run on a computer, causes the computer to perform the method of claim 10.

* * * * *